US012349635B2

(12) United States Patent
Reiner et al.

(10) Patent No.: US 12,349,635 B2
(45) Date of Patent: Jul. 8, 2025

(54) METHOD AND SYSTEM FOR PRODUCING, WITHOUT THE HELP OF A SUBSTRATE, A PLURALITY OF ROOTED CUTTINGS FROM A PLURALITY OF UNROOTED CUTTINGS

(71) Applicant: P&G IP GmbH, Stuttgart (DE)

(72) Inventors: Stefan Reiner, Affalterbach (DE); Dirk Schimmelpfeng, Remseck (DE); Per Klemm, Stuttgart (DE); Karoline Steinberger, Esslingen (DE)

(73) Assignee: P&G IP GmbH, Stuttgart (DE)

( * ) Notice: Subject to any disclaimer, the term of this patent is extended or adjusted under 35 U.S.C. 154(b) by 0 days.

(21) Appl. No.: 18/394,877

(22) Filed: Dec. 22, 2023

(65) Prior Publication Data

US 2024/0206403 A1 Jun. 27, 2024

Related U.S. Application Data

(63) Continuation-in-part of application No. PCT/EP2022/087668, filed on Dec. 23, 2022.

(51) Int. Cl.
*A01G 2/10* (2018.01)
*A01G 9/029* (2018.01)

(52) U.S. Cl.
CPC .............. *A01G 2/10* (2018.02); *A01G 9/0293* (2018.02); *A01G 9/0297* (2018.02)

(58) Field of Classification Search
CPC ...... A01G 2/10; A01G 9/0293; A01G 9/0295; A01G 9/0297; A01G 9/0299; A01G 9/029; A01G 31/02
See application file for complete search history.

(56) References Cited

U.S. PATENT DOCUMENTS 4,037,360 A * 7/1977 Farnsworth ............ A01G 31/02
47/86
4,192,096 A * 3/1980 Platt ..................... A01G 9/0295
47/73
(Continued)

FOREIGN PATENT DOCUMENTS

CH 631049 A5 * 7/1982 ........... A01G 9/0295
EP 3790376 B1 1/2022
(Continued)

OTHER PUBLICATIONS

Website for AutoStix, 6 pages, undated, retrieved Dec. 27, 2023 from https://www.visser.eu/plug-transplanters/autostix/.
(Continued)

*Primary Examiner* — Trinh T Nguyen
(74) *Attorney, Agent, or Firm* — Cooley LLP

(57) ABSTRACT

A method for producing, without the help of a substrate, a plurality of rooted cuttings includes inserting at least one unrooted cutting into pockets arranged successively in a longitudinal direction of a strip element. Each pocket has an opening at a top side facing a transverse direction and a bottom side that is at least partially closed. The strip element is formed at least in part of biodegradable material having a liquid retaining capacity of at least about 100 g liquid per 100 g of biodegradable material dry weight. The strip element has first and second wall-forming members fixed to each other in a spacer area adjacent each pocket and arranged to at least partly overlap in the longitudinal direction and to not fully overlap in the transverse direction. The first wall-forming member extends past the second wall-forming member in the transverse direction at the top side of each pocket.

30 Claims, 5 Drawing Sheets

(56) References Cited

U.S. PATENT DOCUMENTS

| | | | |
|---|---|---|---|
| 9,883,642 B2* | 2/2018 | Friedman | A01G 31/06 |
| 2013/0192133 A1* | 8/2013 | Chodyla | A01G 9/0295 |
| | | | 47/56 |
| 2013/0219788 A1* | 8/2013 | VanLente | A01G 9/025 |
| | | | 47/62 A |
| 2016/0037739 A1* | 2/2016 | Fankuchen | A01G 31/02 |
| | | | 47/62 R |
| 2016/0270303 A1* | 9/2016 | Cooley | A01G 9/0295 |
| 2022/0000038 A1* | 1/2022 | Visser | A01G 2/32 |

FOREIGN PATENT DOCUMENTS

| | | | | |
|---|---|---|---|---|
| NL | 1028486 C2 | 9/2006 | | |
| WO | WO-0052996 A1 | 9/2000 | | |
| WO | WO-2009088774 A2 * | 7/2009 | | A01G 9/08 |
| WO | WO-2015012675 A1 * | 1/2015 | | A01G 31/02 |

OTHER PUBLICATIONS

Extended European Search Report for European Application No. 23220021.2 mailed Jun. 3, 2024, 10 pages.
International Search Report and Written Opinion for PCT Application No. PCT/EP2022/087668 mailed Jun. 20, 2023, 13 pages.
International Search Report and Written Opinion for PCT Application No. PCT/EP2023/087617 mailed Apr. 10, 2024, 14 pages.
International Preliminary Report on Patentability issued by the International Searching Authority for Application No. PCT/EP2022/087668, dated Nov. 7, 2024, 8 pages.

* cited by examiner

METHOD AND SYSTEM FOR PRODUCING, WITHOUT THE HELP OF A SUBSTRATE, A PLURALITY OF ROOTED CUTTINGS FROM A PLURALITY OF UNROOTED CUTTINGS

CROSS-REFERENCE TO RELATED APPLICATIONS

This application claims priority to and the benefit of International Patent Application No. PCT/EP2022/087668, filed Dec. 23, 2022, entitled "A Method and System for Producing, Without the Help of a Substrate, a Plurality of Rooted Cuttings from a Plurality of Unrooted Cuttings," the disclosure of which is incorporated herein by reference in its entirety.

BACKGROUND

The rooting of cuttings nowadays takes place millionfold within the scope of the vegetative propagation of ornamental and agricultural crops. For this purpose, the cuttings are usually planted in a moist substrate in order to develop roots therein. As substrate, for example, soil, perlite, vermiculite, coir, mineral wool, or expanded clay pellets can be used. The cuttings are usually first cultivated in small containers and then, after the first roots have developed, transplanted into larger containers, in which they may later also be transported to customers. The plants are then further cultivated by the customers in yet other containers until they are ready for sale.

The described process of cultivating cuttings is relatively lengthy and also entails losses, since not all cuttings develop as planned. It is desirable therefore to provide an improved way of rooting and cultivating cuttings which on the one hand reduces the outlay in the cultivation of cuttings and on the other hand yields better results, such as, for example, larger and more stable plants and fewer losses. Further, any solution to the problem should be environmentally friendly, in particular with regard to the creation of waste materials. An object of the embodiments of the present disclosure is to provide such a solution to the above problems.

EP 3 790 376 BI discloses a method for the substrate-free rooting of a plurality of unrooted cuttings, which uses a plastic carrier strip, e.g., as marketed under the name AutoStix™ by Visser Horti Systems. The method requires attaching a climate membrane to the carrier strip in such a manner that at least a region of the carrier strip associated with the cuttings bases is enclosed by the climate membrane.

SUMMARY

With a view to solving the problems mentioned above, a first aspect of the present disclosure provides a method for producing, without the help of a substrate, a plurality of rooted cuttings from a plurality of unrooted cuttings, comprising the steps of inserting at least one unrooted cutting into each empty pocket from a plurality of empty pockets of a strip element. The strip element has a longitudinal dimension and a transverse dimension and is formed at least in part of biodegradable material. The strip element forms the plurality of empty pockets arranged successively one after another in a longitudinal direction of the strip element. The strip element has a first wall-forming member and a second wall-forming member arranged to at least partly overlap the first wall-forming member in the longitudinal direction and to not fully overlap the first wall-forming member in a transverse direction of the strip element. The first wall-forming member and the second wall-forming member are fixed to each other in a spacer area of the strip element longitudinally adjacent each pocket to thus delimit the plurality of pockets. Each pocket has a width along the longitudinal direction of the strip element, a depth along the transverse direction of the strip element, an opening at a top side facing the transverse direction of the strip element and through which the at least one unrooted cutting is inserted, and a bottom side opposite the top side that is at least partially closed. The first wall-forming member extends past the second wall-forming member in the transverse direction of the strip element at the top side of each pocket. The biodegradable material has a liquid retaining capacity of at least about 100 g liquid per 100 g of biodegradable material dry weight.

The method may include, either before or after inserting the unrooted cuttings, moistening each pocket with a liquid.

The method may include arranging the strip element in a rooting station and leaving the inserted cuttings to root for a predetermined rooting period. The moistening step may advantageously be carried out in the rooting station.

DETAILED DESCRIPTION

Figure 1:
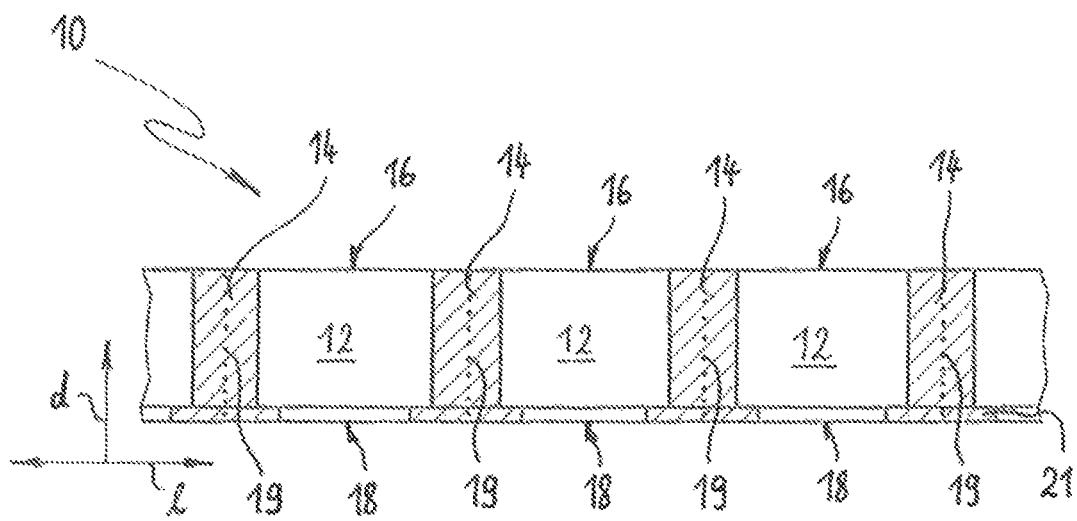
FIG. 1 shows a schematic view of a strip element according to an embodiment.

Methods and systems for producing, without the help of a substrate, a plurality of rooted cuttings from a plurality of unrooted cuttings are described herein. In some embodiments, for example, a method may include inserting at least one unrooted cutting into each empty pocket from a plurality of empty pockets of a strip element. The strip element has a longitudinal dimension and a transverse dimension and is formed at least in part of biodegradable material. The strip element forms the plurality of empty pockets arranged successively one after another in a longitudinal direction of the strip element. The strip element has a first wall-forming member and a second wall-forming member arranged to at least partly overlap the first wall-forming member in the longitudinal direction and to not fully overlap the first wall-forming member in a transverse direction of the strip element. The first wall-forming member and the second wall-forming member are fixed to each other in a spacer area of the strip element longitudinally adjacent each pocket to thus delimit the plurality of pockets. Each pocket has a width along the longitudinal direction of the strip element, a depth along the transverse direction of the strip element, an opening at a top side facing the transverse direction of the strip element and through which the at least one unrooted cutting is inserted, and a bottom side opposite the top side that is at least partially closed. The first wall-forming member extends past the second wall-forming member in the transverse direction of the strip element at the top side of each pocket. The biodegradable material has a liquid retaining capacity of at least about 100 g liquid per 100 g of biodegradable material dry weight.

The method may include, either before or after inserting the unrooted cuttings, moistening each pocket with a liquid.

The method may include arranging the strip element in a rooting station and leaving the inserted cuttings to root for a predetermined rooting period. The moistening step may advantageously be carried out in the rooting station.

Contrary to known methods for producing a plurality of rooted cuttings, the methods and/or systems described herein do not generate any waste materials. In particular, the strip element forming the plurality of empty pockets (which may also be referred to as empty pouches or empty bags) is the one and only structural element and consists essentially of biodegradable material. In other words, the strip element, by way of its wall-forming members, forms the boundaries of each empty pocket or pouch. By "formed at least in part of biodegradable material" we mean that for example some adhesive bonding may be used in forming the strip element, wherein the adhesive or glue may or may not be fully biodegradable. However, even if a not fully biodegradable adhesive or glue is used, this will not result in any noticeable waste material, since the remnants of this adhesive or glue will later form part of any substrate used in the further cultivation of the then rooted cuttings, and residue amounts of such adhesive or glue will be minimal anyway. Of course, a fully biodegradable adhesive may be used. Preferably, the term "biodegradable" as used herein is understood to mean that the materials used for forming the strip element will biologically degrade within a period of no longer than 50 days, and more preferably will biologically degrade within a period of no longer than 28 days, and more preferably within a period of about 10 days. Ideally, the materials used for forming the strip element will slowly degrade when exposed to water or an aqueous solution.

The strip element of the present disclosure has two wall-forming members which are arranged to at least partly overlap each other in the longitudinal direction of the strip element. That is, the two wall-forming members fully overlap each other in the longitudinal direction in areas of the strip element where pockets are present, and at least partly overlap each other in the longitudinal direction in the remaining areas of the strip element. Moreover, the two wall-forming members are arranged such that the second wall-forming member does not fully overlap the first wall-forming member in a transverse direction of the strip element. That is, the first wall-forming member extends past the second wall-forming member in the transverse direction of the strip element at the top side of each pocket to create a guiding area just above each pocket, which guiding area serves to facilitate inserting an unrooted cutting into the pocket by simplifying the process of widening the opening at the top side of each pocket. This applies to both manual and automated insertion of unrooted cuttings into the pockets. For example, a finger or similar element of an automated inserting device may be guided by the guiding area into the top side opening of any given pocket, and may then be manipulated to widen said top side opening to allow easy access to that pocket, with a view to enable quick and successful insertion of unrooted cuttings into the pockets. The guiding area created by the first wall-forming member extending past the second wall-forming member in the transverse direction of the strip element at the top side of each pocket may have a width in the transverse direction of the strip element ranging from several millimeters to a few centimeters, as desired in any given application. Generally, the width of the guiding area in the transverse direction of the strip element will be chosen to be as small as possible, and as large as needed to ensure that the process of inserting unrooted cuttings make take place quickly and reliably. For example, the width of the guiding area in the transverse direction of the strip element may be in the range of from 2 mm to 2 cm.

Each wall-forming member may be a separate element. Alternatively, the two wall-forming members may be obtained by longitudinally folding over a large enough piece of wall-forming member material such that the folded part at least partly overlaps with the non-folded part. At least one of the first and second wall-forming members may consist of more than just one layer, for example two or three layers.

To obtain a structurally stable strip element, the first and second wall-forming members are fixed to each other in spacer areas of the strip element, which spacer areas are arranged adjacent to each pocket, as seen in a longitudinal direction of the strip element. The spacer areas thus provide the desired structural stability and at the same time physically delimit each of the plurality of pockets at each side thereof. Further, the spacer areas create a desired spacing in the longitudinal direction between successive pockets.

Whatever materials are being used in generating the first and second wall-forming members, the resulting wall-forming member will be water-resistant, but water- and air-permeable and will have a liquid retaining capacity of at least about 100 g liquid per 100 g of biodegradable material dry weight. In other words, the resulting wall-forming member will be able to retain at least its own dry weight of liquid, and, in some embodiments, at least twice or three times its own dry weight of liquid (which means a retaining capacity of at least about 200 g liquid per 100 g of biodegradable material dry weight, or at least about 300 g liquid per 100 g of biodegradable material dry weight, respectively). This will enable the resulting strip element to soak up and retain enough liquid and associated nutrients to ensure rooting of the unrooted cuttings once they have been placed into the pockets. The strip element may be designed such that it is able to absorb the required amount of liquid quickly, that is, within a period of from a few seconds to no more than a few minutes. The liquid retaining characteristics of the strip element according to the present disclosure may be achieved, for example, by means of cellulose as a constituent of the material used in making the wall-forming members. Both the first wall-forming member and the second wall-forming member may thus be paper fiber webs, e.g., based on cellulose fibers. However, other or additional substances may also be used, for example so-called superabsorbers as well as plastic fibres or natural fibres.

Water-resistant here means that the resulting strip element does not dissolve in water or does not degrade too quickly under the exposure of water. Materials to be used in making the wall-forming members can be paper-like (with or without perforations), film-like (in particular perforated), fabric-like or nonwoven-like. As material for the wall-forming member, in addition to the materials used for producing paper, also plastic materials and natural fibres can be considered, provided they are at least essentially biodegradable. Composite materials may also be used.

The empty pockets created by joining the first and second wall-forming members to each other as explained above at least partly closed at the bottom side and appropriately sized to accommodate at least one unrooted cutting. In some embodiments, the empty pockets created by joining the first and second wall-forming members are fully closed at the bottom side. Depending on the type of unrooted cuttings to be processed, a size of each pocket will either be smaller (if unrooted cuttings having a thin stem shall be processed) or larger (if unrooted cuttings to be processed have a thicker stem). Moreover, the size of each pocket is designed such that unrooted cuttings inserted into associated pockets will be self-retained in those pockets.

More specifically, the strip element is provided in such a form that each cutting is reliably retained by itself in the associated pocket of the strip element. This may be achieved for example by appropriately dimensioning the pockets in accordance with the particular application, such that a certain clamping force is exerted on a cutting positioned in a pocket by the first and second wall-forming members. In order that the further development of the cuttings proceeds as uniformly as possible, it may be desirable for the cuttings to all be of the essentially same size and maturity.

As seen in the longitudinal direction of the strip element, the length of material of the second wall-forming member used in forming a pocket of the plurality of empty pockets exceeds the length of material of the first wall-forming member used in forming the pocket, for example, by at least 5% to 10%, 20% or even 30%, depending on the size of the pocket needed for a particular application. By using a defined slightly increased amount of material for the second wall-forming member in the longitudinal direction of the strip element when forming the pockets, each pocket bulges slightly outwardly on the side of the second wall-forming member, easing the process of inserting an unrooted cutting into the pocket and helping in obtaining an appropriately sized pocket dimensioned to exert a desired amount of clamping force onto an unrooted cutting that has been inserted into the pocket. In some embodiments, the length of material of the second wall-forming member used in forming a pocket of the plurality of empty pockets exceeds the length of material of the first wall-forming member used in forming the said pocket by at least 2% to at most 30%, at most 20%, at most 10%, or at most 5%.

The shape of each pocket provided by the strip elements herein may be one of essentially rectangular and essentially square. By "essentially rectangular" and "essentially square" we mean that the shape of each pocket, pouch or bag may have corners, that are more or less rounded. Alternatively, the shape of each pocket may taper from its opening at the top side of the strip element towards the opposite bottom side of the pocket. The degree of taper may vary according to the desired application, and may be any of a slight taper, a modest taper and a pronounced taper.

Depending on the particular application and as needed, the bottom side of each pocket provided by the strip element may either be partly closed or fully closed. If the first and second wall-forming members are generated by longitudinally folding over a suitably large piece of wall-forming material, the bottom side of each pocket will initially be closed, and would need to be opened partly. e.g., by cutting, if a partly open bottom side of each pocket is desired. If the first and second wall-forming members are separate elements from the start, a closed or partly closed bottom side of each pocket may be obtained by fixing the first and second wall-forming members to each other not only in the spacer areas, but also in those areas where the bottom side shall later remain closed. This may be done in the same step as the fixing occurring in the spacer areas of the strip element, e.g., by using heated press rolls and a hot-melt adhesive applied to the respective areas.

To provide additional structural stability to the strip element, an edge region of at least one of the first and second wall-forming members at the pocket bottom side of the strip element may be provided with a structural reinforcement. For example, the edge region may be folded over onto itself to form a thickened web-like portion extending along the length of the strip element at said edge, thus creating a structural reinforcement in the strip element's lengthwise direction. Due to the additional material thickness obtained in this way, this structural reinforcement also serves to enhance the liquid retaining ability of the strip element at its pocket bottom side. Alternatively, or in addition, a separate reinforcement member may be provided at an edge region of the strip element. Moreover, a structural reinforcement may be achieved by at least one of sewing/stitching, adhesively bonding and crimping an edge region of the strip element.

By way of example, an edge region of the first wall-forming member may be folded outwardly onto itself and an edge region of the second wall-forming member may also be folded outwardly onto itself, wherein the two edge regions of the first and second wall-forming members, respectively, may have the same width in the transverse direction of the strip element. Alternatively, an edge region of the first wall-forming member and an edge region of the second wall-forming member may be folded over onto the same side, that is, the edge region of for example the first wall-forming member will be folded over outwardly onto itself and the edge region of the second wall-forming member will be folded over to the same side as the edge region of the first wall-forming member to overlap the edge region of the first wall-forming member. According to a still further alternative, an edge region of at least one of the first and second wall-forming members may be folded inwardly onto itself before joining the first and second wall-forming members to each other by for example crimping or gluing.

Folding over an edge region of the strip element is also possible if the first and second wall-forming members are generated by longitudinally folding over a suitably large piece of wall-forming material onto itself, that is, if the first and second wall-forming members are generated from one piece of material, as previously described. Once the first and second wall-forming members have been obtained by folding over a suitably large piece of wall-forming material along its length, an edge region located at the pocket bottom side of the strip element may again be folded over onto itself to thus create a structurally more stable thickened edge.

Regardless of whether one or two edge regions of the first and second wall-members, respectively, are folded over in the same or opposite directions, the folded over edge regions may be fixed in position by for example gluing or crimping, that is, in the same way as the first and second wall-forming members are fixed to each other in the spacer areas of the strip element. Such fixing may be achieved simultaneously with fixing the wall-forming members to each other in the spacer areas, or may be done separately.

It will be understood that folding over edge regions of the strip element may result in the bottom side of each pocket being closed. If it is desired that the bottom side of each pocket is partially open, the pockets will have to be cut open at their bottom side as desired.

The strip element according to the present disclosure offers a great deal of flexibility, that is, it may easily be adapted to various needs. For example, if cuttings to be rooted will have or form larger leaves, spacings between successive pockets will likely need to be larger than if cuttings to be rooted have or will form just small leaves. Likewise, the size of each pocket provided by the strip element may vary broadly according to what is desired for specific cuttings to be rooted. Specifically, the width of each pocket, which is the extent of each pocket along the longitudinal direction of the strip element, may vary broadly to accommodate specific requirements. For example, if cuttings to be rooted have thin stems, the width of each pocket will be smaller than if cuttings to be rooted have thick stems. If a pocket has a tapering shape, its width will generally be measured in the middle of the pocket, and the pocket will have a larger width towards and at its opening at the one side and will have a smaller width towards and at its bottom side opposite the one side. In some embodiments, the width of each pocket at its bottom side will amount to about 50%, 60% or 70% of the pocket width at its opening.

A longitudinal dimension of each spacer area (that is, its width) may be one of the following:
 smaller than the width of the pocket;
 at least about equal to the width of the pocket; and
 larger than the width of the pocket.

In particular, a longitudinal dimension of each spacer area may be significantly smaller or larger than the width of the pocket, that is, at least 10% or 20% or 30% or even 50% smaller or larger than the width of the pocket. In some embodiments, the longitudinal dimension of the spacer areas is defined such that a spacing, in the longitudinal direction of the strip element, between midpoints of consecutive pocket widths is constant, regardless of the individual pocket width. Such constant spacing between pocket width midpoints is desirable and advantageous when processing strip elements according to the present disclosure by means of automated machinery. Moreover, such constant spacing between pocket width midpoints allows for a space saving arrangement of strip elements filled with cuttings during rooting and subsequent cultivation. In other words, such constant spacing between pocket width midpoints results in a constant grid dimension, which is advantageous in that it facilitates for example automated processing and space-saving rooting and cultivation.

In some embodiments, the first wall-forming member and the second wall-forming member are fixed to each other in each spacer area of the strip element by an adhesive bonding technique. A hot-melt adhesive may be used, such as a biodegradable hot-melt adhesive. Glueless joining techniques are also available for fixing the first and second wall-forming members to each other in each spacer area of the strip element. As an example, embossing or crimping techniques (as for example used in manufacturing coffee filters) well known to the person skilled in the art may be used in each spacer area to adhere the first and second wall-forming members to each other without the use of any glue. If desired to increase bonding strength, a small amount of any suitable glue may be used in addition to an embossing technique. Accordingly, the amount of glue needed for fixing the first and second wall-forming members to each other in each spacer area may be significantly reduced by using an embossing technique. Other glueless joining techniques such as sewing or stitching or friction welding may also be used to secure the first wall-forming member and the second wall-forming member to each other in each spacer area of the strip element. In some embodiments, the first wall-forming member and the second wall-forming member are fixed to each other using a meander-shaped bonding line. That is, the meander-shaped bonding line will run across the spacer area between two consecutive pockets near or at the open top side of each pocket, and will then run down along one side of the pocket and across the bottom side of each pocket, thus forming a pocket that is fully closed at its bottom side, and will then run up along the other side of the pocket towards the open top side of the pocket, thus delimiting each pocket at its two sides, and will then run across the next spacer area between two consecutive pockets towards the next pocket, and so on.

Depending on the type and construction (number of layers, etc.) of the first and second wall-forming members used in making the strip element, a thickness of the strip element forming the plurality of empty pockets may be in the range of about 0.5 mm to about 5 mm.

Within the scope of experimental tests, favourable results have been obtained with first and second wall-forming members each having an air permeability in the range of from 1100 to 1200 l/m²s. It has further been found to be advantageous that the first and second wall-forming members each have a tensile strength of from 13.0 N to 16.0 N/15 mm in the machine direction (based on the process of paper production) and from 7.0 N to 9.5 N/15 mm transversely to the machine direction (again based on the paper production process). A material which is particularly suited for making the first and second wall-forming members is a product marketed by the Danish company Ellepot A/S under the trade name Ellepot® Organic 2.0. Under the trade name Ellepot® Organic 10 weeks, the same company also markets another product which is particularly suited for making the first and second wall-forming members.

With a view to facilitate separating a strip element of a given length into shorter portions, each spacer area may comprise a perforation line running along the transverse direction of the strip element. Portions of any desired length may thus be easily obtained by simply tearing off a portion having a desired length from the remaining length of the strip element, without having to use any tool. Alternatively, portions of any desired length may be obtained by transversely cutting the strip element at the appropriate spacer area.

Strip elements containing at least one unrooted cutting in each of their pockets may be arranged in a rooting station, in which the cuttings remain for a predetermined period of time, with regular misting, in order to root. This predetermined period of time can last, for example, from 2 to 3 weeks. In the rooting station, the strip element serves to create a constant microclimate around the cuttings, in particular around the stem region of each cutting, thus enabling and promoting the rooting process. Owing to its water- and air-permeability, the strip element serves to maintain this microclimate around the cuttings in an desired range for rooting. Specifically, the strip element on the one hand prevents the cutting bases from standing in liquid, which would promote rotting, and on the other hand prevents the cutting bases from drying out, which would deter rooting of the cuttings. The degree of regular misting is appropriately adapted to the type of cuttings contained in the pockets of the strip element, such that cuttings of a plant species or variety that requires more water are misted more frequently than cuttings of a plant species or variety that requires only a little moisture for rooting.

The advantages resulting from the processes described herein are manifold. Unrooted cuttings may be rooted without the use of any substrate and without creating problematic waste materials. The embodiments described herein provide an inexpensive, scalable solution to enable transport of rooted cuttings with low transportation weight (due to the lack of any substrate), and further provides rooted cuttings in a "ready-to-be-directly-transplanted form", since due to the biodegradable nature of the strip element, rooted cuttings may directly be transplanted into a growth medium at the customer's end, without first having to remove the rooted cuttings from the pockets of the strip element. Rooted cuttings may therefore be transported from propagation countries (such as e.g. in Africa) to marketing countries (such as in Europe or North America) without violating phytosanitary requirements (such as US import laws) and environmental regulations. Transportation weight will be much lower than usual (as no substrate needs to be transported), thus significantly reducing transportation costs. Further, it is no longer necessary to transfer rooted cuttings to larger containers before the rooted cuttings are transported to, for example, a customer. Instead, at the end of the predetermined rooting period, which differs according to the plant species or variety, the cuttings in the strip element are rooted well enough to be transported, for example, to customers in the strip element, and may at the customer's end be transferred directly to those containers in which they will be further cultivated and/or sold.

In some embodiments, a strip element filled with unrooted cuttings may be immersed for a predetermined period of time in a hormone solution in such a manner that the stem region of each cutting is submersed in the hormone solution. The predetermined period of time for which the strip element provided with cuttings is immersed in the hormone solution can be, for example, between one and eight hours (e.g., approximately six hours). During the predetermined period of time, the cuttings in the strip element may be misted regularly in order to prevent them from drying out.

From the end of the predetermined period of time the cutting is submersed in the hormone solution, the strip element acts as a buffer or storage for the hormone solution. The application time of the hormone solution in the stem region of the cuttings is thus extended significantly. The same is true for each further treatment carried out during the rooting process, such as, for example, fertilisation as well as biological and fungicidal treatments. In any case, the strip element ensures, during the subsequent rooting phase, that the moisture and the microclimate around the cuttings are desirable for uniform callusing and/or root development.

In some embodiments, at the end of the rooting process in the rooting station, the rooted cuttings are washed with a solution containing mycorrhiza. This promotes root branching and increases the robustness of the rooted cuttings.

Depending on the further use, as intended by the customer, of the strip elements containing the now rooted cuttings, roots protruding from the bottom of the pockets of the strip element can be cut off. This is recommended in particular when the strip elements containing the rooted cuttings are to be further processed by machine, since roots protruding from the bottom of the strip element can lead, for example, to blocking of a mechanical separating device. When cutting off the roots protruding from the bottom of the strip element, it should be ensured that damage to the roots is minimised, that is to say only as much as necessary and as little as possible is cut off. Cutting back the roots in the described manner prior to dispatch has the advantage that the wounds produced at the roots by the cutting back will close during transport to the customer and the roots re-branch again and develop root hairs. It is advantageous to cut the roots close to the root base since re-branching and root hair formation then take place directly at the root base. For the customer, cutting back the roots prior to dispatch has significant advantages in relation to more even and less problematical growth of the rooted cuttings in less time. Overall, the stock is more homogeneous, there are fewer losses and the cultivation time (that is to say the cultivation time until the plant is ready for sale) is shorter. If the roots are not cut back as described prior to despatch, most root hairs are at or close to the root tips. During transport and subsequent further processing of such cuttings with roots that have not been cut back, there is a risk that the root tips will break off, resulting in that the root hairs at the root tips are also lost. This risk is reduced significantly by cutting off the roots as described prior to dispatch and moreover, as described, new root branches and root hairs can develop close to the root base during the transportation period, which leads to the aforementioned advantages.

In some embodiments, the roots of the cuttings are treated with a plant strengthener, whereby the above-described advantageous effects are further enhanced.

According to a second aspect of the present disclosure there is provided an apparatus for producing, without the help of a substrate, a plurality of rooted cuttings from a plurality of unrooted cuttings, the apparatus comprising:
(i) a first wall-forming member formed at least in part of biodegradable material;
(ii) a second wall-forming member formed at least in part of the biodegradable material, the second wall-forming member arranged to at least partly overlap the first wall-forming member in a longitudinal direction and to not fully overlap the first wall-forming member in a transverse direction; and
(iii) a plurality of empty pockets arranged successively one after another in the longitudinal direction, wherein the plurality of empty pockets are collectively formed by the first wall-forming member and the second wall-forming member, and wherein each pocket has a width along the longitudinal direction, a depth along the transverse direction, an opening at a top side facing the transverse direction, and a bottom side opposite the top side, the bottom side being at least partially closed, the first wall-forming member extending past the second wall-forming member in the transverse direction at the top side of each pocket, the first wall-forming member and the second wall-forming member being fixed to each other in a spacer area longitudinally adjacent each pocket to thus delimit the plurality of pockets.

The apparatus according to the second aspect may further include, either separately or in any combination, any one of the specific features discussed above in connection with the strip element of the method according to the first aspect.

According to a third aspect of the present disclosure there is provided a system for producing, without the help of a substrate, a plurality of rooted cuttings from a plurality of unrooted cuttings, wherein the system comprises:
(i) a strip element having a longitudinal dimension and a transverse dimension and consisting essentially of biodegradable material, the strip element forming a plurality of empty pockets arranged successively one after another in a longitudinal direction of the strip element, wherein the strip element has a first wall-forming member and a second wall-forming member arranged to at least partly overlap the first wall-forming member in the longitudinal direction and to not fully overlap the first wall-forming member in a transverse direction of the strip element, wherein the first wall-forming member and the second wall-forming member are fixed to each other in a spacer area of the strip element longitudinally adjacent each pocket to thus delimit the plurality of pockets, wherein each pocket has a width along the longitudinal direction of the strip element, a depth along the transverse direction of the strip element, an opening at a top side facing the transverse direction of the strip element, and a bottom side opposite the top side, wherein the bottom side is at least partially closed and the first wall-forming member extends past the second wall-forming member in the transverse direction of the strip element at the top side of each pocket, and wherein the biodegradable material has a liquid retaining capacity of at least about 100 g liquid per 100 g of biodegradable material dry weight; and (ii) at least one cutting inserted into each previously empty pocket.

Depending on the state of the rooting process, the cuttings contained in the pockets of the strip element will be either unrooted (at the start of the rooting process), partly rooted (during the rooting process) or fully rooted (at the end of the rooting process). It is to be noted that according to the present disclosure the pockets do not contain any substrate material such as peat, soil etc., as conventionally used in rooting unrooted cuttings. However, the stem of each unrooted cutting inserted into the pockets may be coated with gel or a similar material.

The strip element forming part of such a system may include any of the characteristics set out above in relation to the method and apparatus of the present disclosure.

The present disclosure further relates to a method of planting rooted cuttings, comprising:

(i) receiving an apparatus with a plurality of pockets according to the second aspect of the present disclosure, wherein each pocket holds at least one rooted cutting;

(ii) separating a pocket holding at least one rooted cutting from the apparatus; and (iii) planting the pocket holding the at least one rooted cutting in a growth medium.

The growth may be, for example, soil.

Embodiments will now be further explained by referring to the accompanying schematic drawings, which are provided to facilitate a better understanding of the inventive concepts herein.

FIG. 1 shows a schematic side view of a first general embodiment of a strip element or apparatus 10 which may be used in a method and system according to an embodiment. The strip element 10 extends along a longitudinal direction 1, which is the main direction of the strip element 10, and a transverse direction d. The strip element 10 has a transverse dimension D (FIG. 3A), and may be endless in longitudinal direction, but will in practise be manufactured to have a desired length, resulting in a longitudinal dimension L (FIG. 3A).

The strip element 10 is designed to provide (as further explained below) a plurality of empty pockets 12 arranged successively one after another in the longitudinal direction 1 of the strip element 10, wherein each pocket 12 is separated from an adjacent pocket 12 by a spacer area 14 of the strip element 10, such that a strip element 10 essentially consists of an alternating succession of pockets 12 and spacer areas 14.

Figure 3A:
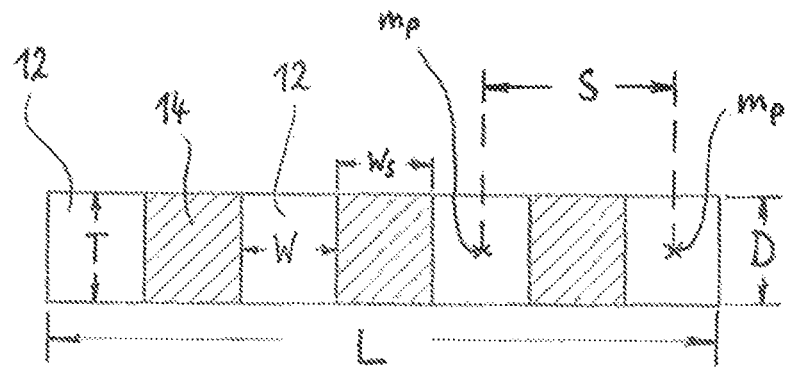
FIGS. 3A-3D schematically show variations of longitudinal dimensions of pockets relative to longitudinal dimensions of spacer areas of different strip elements, each according to an embodiment.

Each pocket 12 has a width W along the longitudinal direction 1 of the strip element 10, as well as a depth T along the transverse direction d of the strip element 10 (FIG. 3A). Further, each pocket 12 has an opening 16 at a top side 17 of the strip element, wherein the opening 16 faces the transverse direction d of the strip element 10. In other words, the free area or top side 17 (FIG. 4) of each opening 16 forms a plane which is at least essentially orthogonal to the transverse direction d of the strip element 10. Still further, each pocket 12 has a bottom side 18 opposite the one side where the opening 16 is located.

In the embodiment shown in FIG. 1, the general shape of each pocket 12 is essentially rectangular, and the general shape of each spacer area 14 is essentially rectangular. However, in FIG. 1, a longitudinal dimension, that is, a width $w_s$ (FIG. 3A) of each spacer area 14 is smaller than the width W of each pocket 12.

To provide additional structural stability to the strip element 10, an edge region 21 at the pocket bottom side of the strip element 10 may be provided with a structural reinforcement (not shown). For example, the edge region 21 may be folded over onto itself to form a thickened web-like portion extending along the entire length of the strip element 10 at said edge, thus creating a structural reinforcement in the strip element's longitudinal direction 1. Due to the additional material thickness obtained in this way, this structural reinforcement may also serve to enhance the liquid retaining ability of the strip element 10 at its pocket bottom side. Alternatively, or in addition, a separate reinforcement member (not shown) may be provided at an edge region 21 of the strip element 10. Moreover, a structural reinforcement may be achieved by at least one of sewing/stitching, adhesively bonding and crimping (not shown) the edge region 21 of the strip element 10.

Figure 3B:
Figure 3C:
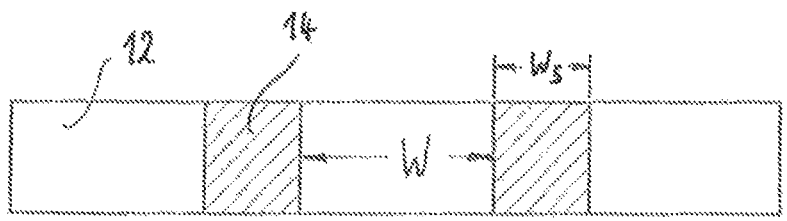
Figure 3D:
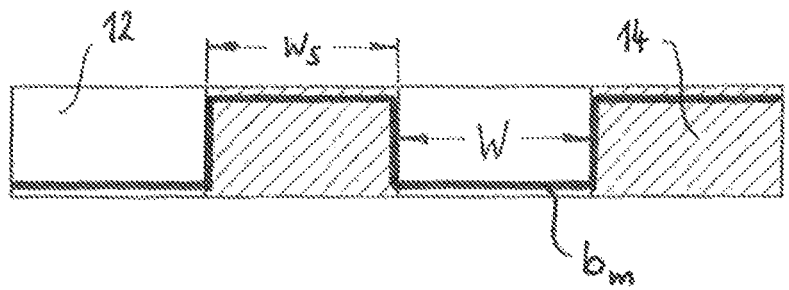

As schematically shown in FIGS. 3A-3D, many different embodiments of the strip element 10 are possible. In FIG. 3A, the shape of each pocket 12 and each spacer area 14 is almost square and a width $w_s$ of each spacer area 14 is equal to the width W of each pocket 12. In FIG. 3B, the shape of each pocket 12 is essentially square, whereas the shape of each spacer area 14 is rectangular. The longitudinal dimension or width $w_s$ of each spacer area 14 is significantly larger than the width W of each pocket 12. Conversely, as shown in FIG. 3C, the longitudinal dimension or width $w_s$ of each spacer area 14 may be significantly smaller than the width W of each pocket 12. In FIG. 3C, pockets 12 have an essentially rectangular shape, whereas the shape of each spacer area 14 is essentially square. Finally, as shown in FIG. 3D, both the pockets 12 and the spacer area 14 may have an essentially rectangular shape, and the longitudinal dimension or width $w_s$ of each spacer area 14 may be equal to the width W of each pocket 12.

The embodiments shown in FIGS. 3A-3D are just examples illustrating possible shape and size relations between pockets 12 and spacer areas 14, and many more modifications are possible. Generally, the width W of a pocket 12 will be smaller if the pocket 12 is intended to receive an unrooted cutting having a thinner stem, whereas the width W of each pocket 12 will be larger if pockets 12 shall accommodate unrooted cuttings with thicker stems. Likewise, the width $w_s$ of each spacer area 14 will be smaller if unrooted cuttings to be processed have only small leaves (or will develop only small leaves during rooting), whereas the width $w_s$ of each spacer area 14 will be larger if unrooted cuttings to be processed have larger leaves (or will develop larger leaves during rooting).

In some embodiments, the longitudinal dimension of the spacer areas 14, that is, their width $w_s$ (or $w_s'$, if the pocket is tapered), is defined such that a spacing S, in the longitudinal direction 1 of the strip element 10, 10', 10", between midpoints $m_p$ of consecutive pockets 12, 12' is constant, regardless of the individual pocket width W, W' (FIG. 3A).

Figure 2:
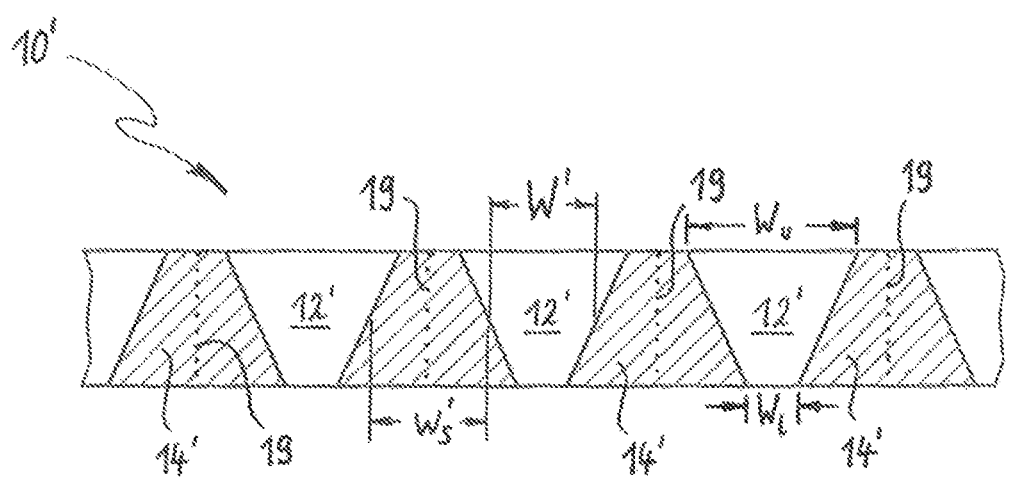
FIG. 2 shows a schematic view of a strip element according to an embodiment.
Figure 4:
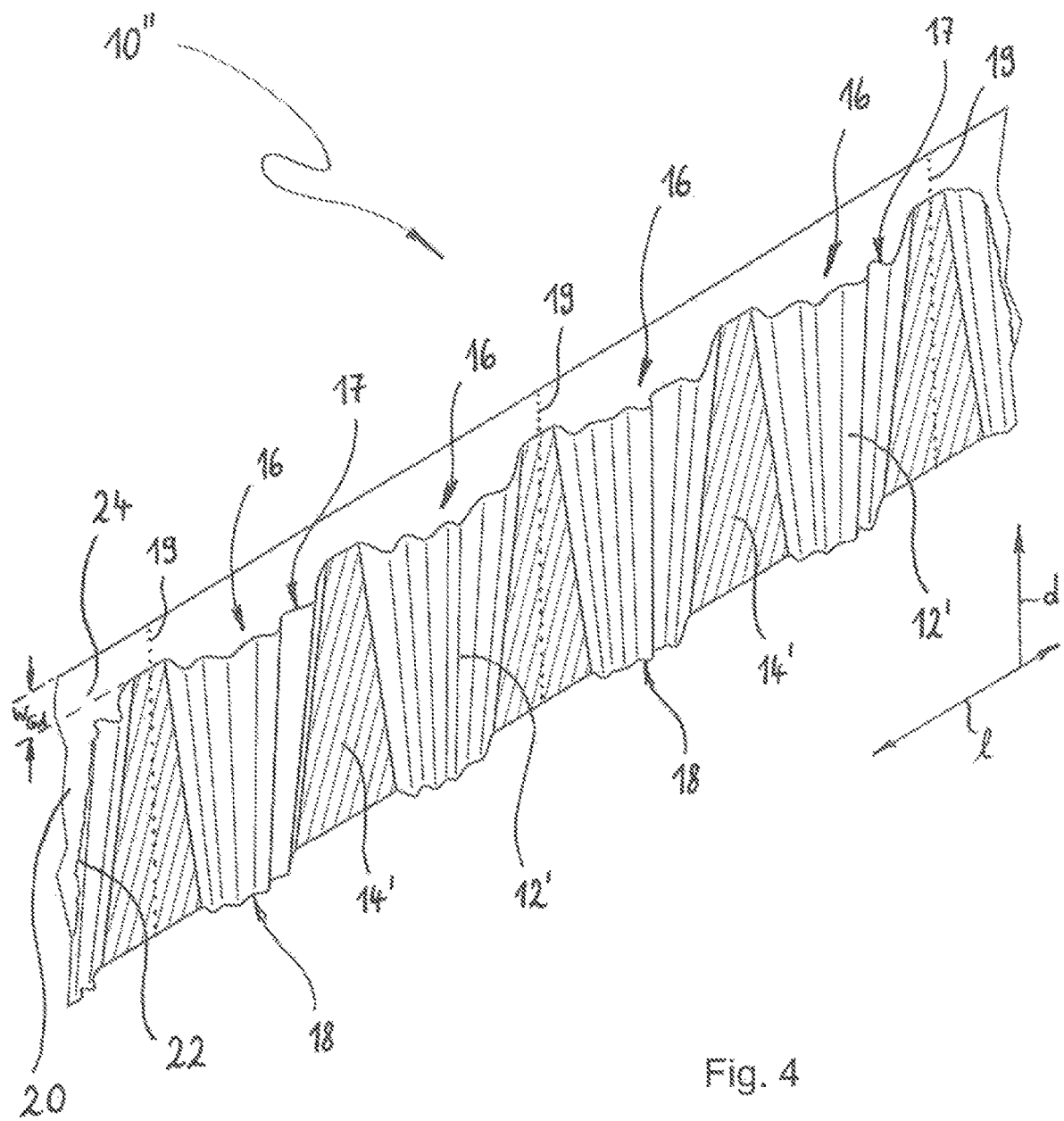
FIG. 4 shows a more detailed perspective view of a strip element similar to the strip element shown in FIG. 2.

As shown in FIGS. 1, 2 and 4, perforation lines 19 may be provided in each spacer area 14 to enable separating any desired length of strip element 10 from the remaining strip element without having to use a tool. While those perforation lines 19 are only shown in FIGS. 1, 2 and 4, they may of course be provided in any embodiment of the strip element described herein.

FIG. 2 shows a schematic side view of a second general embodiment of a strip element 10' which may be used in a method and system according to the present disclosure. The second embodiment differs from the first embodiment shown in FIG. 1 in that the shape of each pocket 12' is tapered. Specifically, the shape of each pocket 12' tapers from its opening 16 at the top side 17 towards its bottom side 18. Consequently, the shape of each spacer area 14' is tapered in the opposite direction. While not shown, a relation between a width W', as measured in the middle of the pocket with regard to the transverse direction d of the strip element 10, of each pocket 12' and a width $w_s'$ of each spacer area 14 may vary just as explained with regard to FIGS. 3A-3D, with a view to accommodate for thinner and thicker stems as well as smaller and larger leaves, respectively, of unrooted cuttings to be processed. If the shape of each pocket 12' tapers from its opening towards its bottom side, each pocket 12' will have an upper width $W_u$ at the top opening 16 and a lower width $W_l$ at the bottom side 18 (FIG. 2), with the upper width $W_u$ being larger than the lower width $W_l$. In certain embodiments, the lower width $W_l$ will amount to about 50% of the upper width $W_u$. In other embodiments, the lower width $W_l$ will amount to about 60% to 70% of the upper width $W_u$.

Referring again to FIG. 1, the bottom side 18 of each pocket 12, 12' may either be partly closed (as shown in FIG. 1) or may be fully closed (e.g. as shown in FIG. 3D).

FIG. 4 shows a more detailed perspective view of an embodiment of a strip element 10", which is similar to the embodiment shown in FIG. 2. Some perforation lines 19 are shown in FIG. 4, and more may exist, as shown in FIG. 2. Each strip element 10, 10', 10" has a first wall-forming member 20 and a second wall-forming member 22 which is arranged to at least partly overlap the first wall-forming member 20 in the longitudinal direction 1 of the strip element 10, 10', 10". As also shown in FIG. 4, the second wall-forming member 22 does not fully overlap the first wall-forming member 20 in the transverse direction d of the strip element 10, 10', 10", that is, the transverse dimension of the second wall-forming member 22 is a little smaller than the transverse dimension of the first wall-forming member 20. Both the first wall-forming member 20 and the second wall-forming member 22 are web-shaped and consist of at least essentially biodegradable material. For example, the first wall-forming member 20 and the second wall-forming member 22 may both be paper fiber webs. Each of the first wall-forming member 20 and second wall-forming member 22 may have one or more layers (not shown). Each of the first wall-forming member 20 and the second wall-forming member 22 may have a woven structure or a non-woven structure. In some embodiments, each of the first and second wall-forming members 20, 22 mainly consist of fibers, such as cellulose fibers.

With a view to forming pockets 12, 12', the first wall-forming member 20 and the second wall-forming member 22 are fixed to each other in each spacer area 14, 14' of the strip element 10, 10', 10". Each spacer area 14, 14' thus effectively physically delimits one side of adjacent pockets 12, 12' while at the same time providing structural integrity to the strip element 10, 10', 10". Fixing the first wall-forming member 20 to the second wall-forming member 22 in the spacer areas 14, 14' may for example be achieved by means of a thermoplastic glue, such as a hot-melt adhesive, but glueless fixing is also possible, for example by applying an embossing or crimping technique to the area of the spacer areas 14, 14'. If gluing is used, it may be desirable for the glue to be a biodegradable glue, such as for example a starch based glue.

In some embodiments, the first wall-forming member 20 and the second wall-forming member 22 are fixed to each other using a meander-shaped bonding line $b_m$ (FIG. 3D). While the meander-shaped bonding line $b_m$ is shown to be continuous in FIG. 3D, it may also be intermittently formed. As shown in FIG. 3D, the meander-shaped bonding line $b_m$ will run across the spacer area 14 between two consecutive pockets 12 near or at the open top side 17 of each pocket 12, and will then run down along one side of the pocket 12 and across the bottom side 18 of each pocket 12, thus forming a pocket that is fully closed at its bottom side 18, and will then run up along the other side of the pocket 12 towards the open top side 17 of the pocket 12, thus delimiting each pocket 12 at its two sides, and will then run across the next spacer area 14 between two consecutive pockets towards the next pocket 12, and so on.

As may be gathered from FIG. 4, when joining the first wall-forming member 20 to the second wall-forming member 22, the latter is fed at a slightly higher speed than the former, such that in the area of the pockets 12, 12' there will be more second wall-forming member material available for forming the pockets 12". As people skilled in the art will know, joining of the first and second wall-forming members 20, 22 may be achieved by two press rolls contacting each other (and those press rolls may have different speeds of rotation). Further, as may also be gathered from FIG. 4, inserting unrooted cuttings into pockets 12, 12' is facilitated in that the first wall-forming member 20 extends past the second wall-forming member 22 in the transverse direction d of the strip element at the top side 17 of each pocket 12, 12', thus creating a funnel-like surface or, more generally, guiding area 24 which serves to effectively guide the stem of an unrooted cutting (not shown) into the respective pocket 12, 12'. A width $w_{GA}$ (FIG. 4), in the transverse direction d of the strip element, of the guiding area 24 may for example be in the range of from 2 mm to 2 cm. In some embodiments, the width $w_{GA}$ may be in the range of from 4 mm to 1 cm.

Figure 5:
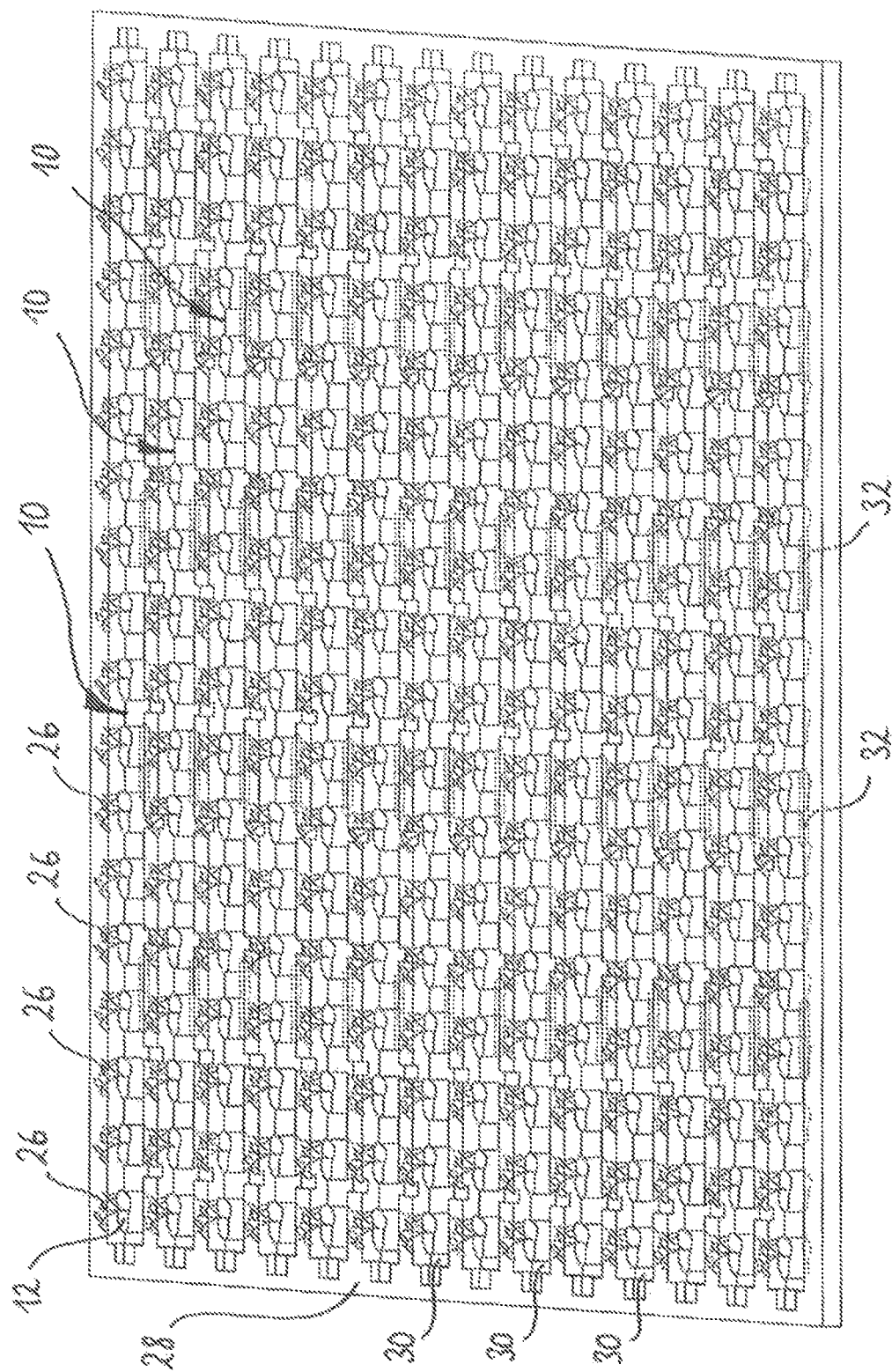
FIG. 5 shows a plurality of strip elements provided with cuttings arranged in a cultivation tray forming part of a rooting station (not shown) according to an embodiment.

FIG. 5 shows how strip elements 10 (or 10' or 10") filled with unrooted cuttings 26 may be arranged in a rooting station. FIG. 5 shows a perspective top view of a plastic cultivation tray 28 as conventionally utilized for cultivating cuttings or seedlings using a substrate. Cultivation tray 28 has a plurality of grooves or trenches 30 designed to receive a substrate material. Apertures 32 at the bottom of each trench 30 serve to discharge excessive fluid. However, no substrate material will be filled into the trenches 30. Instead, strip elements 10, 10', 10" filled with unrooted cuttings 26 and cut or manufactured to a length corresponding to the length of each trench 30 are arranged in the trenches 30. A cultivation tray 28 accommodating a plurality of strip elements 10, 10', 10" filled with unrooted cuttings 26 may then be positioned in a rooting station (not shown) for further processing.

Figure 6:
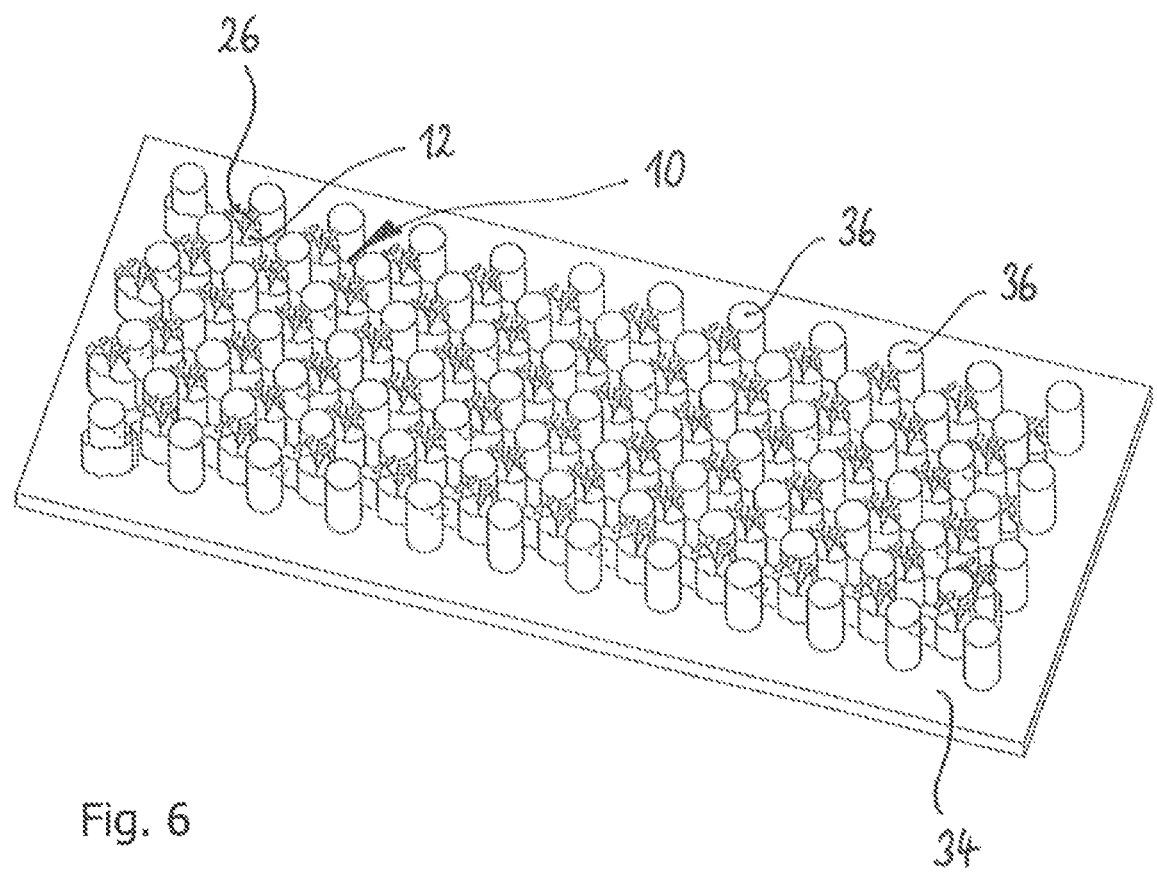
FIG. 6 shows a strip element provided with cuttings and arranged on a carrier plate forming part of a rooting station (not shown) according to an embodiment.

FIG. 6 shows an alternative embodiment. Instead of the cultivation tray 28 shown in FIG. 5, a plate 34 is used, which plate 34 has several lines of protruding pins 36, wherein the pins 36 in each line are spaced from one another and wherein each line of pins 36 is laterally spaced from any adjacent line of pins 36. As shown, a strip element 10 (or 10' or 10") filled with unrooted cuttings 26 may be placed on the plate 34 such that the pockets 12 are each arranged between two adjacent lines of protruding pins 36 and the entire strip element 10 meanders between the plurality of lines of protruding pins

36. As also shown in FIG. 6, a first and last pocket 12 of the strip element 10 may be left empty, such that those two empty pockets 12 may be fit over a corresponding protruding pin 36 to positively localize the strip element 10 at its beginning and end. Just like cultivation tray 28, plate 34 may be positioned in a rooting station (not shown) for further processing.

An example of the method according to the present disclosure will be described in greater detail hereinbelow: Cuttings of the variety Gaura Lindheimerii Belleza® Dark Pink are to be rooted. For this purpose, unrooted cuttings of essentially uniform size and maturity were first inserted into strip elements, such as the strip elements 10, 10', 10" discussed above. The strip elements were made from webs using a product marketed by the Danish company Ellepot A/S under the trade name Ellepot® Organic 2.0. The webs had a liquid-absorbing capacity of approximately 340 g per 100 g of dry material. Further experiments were conducted using a product marketed by the Danish company Ellepot A/S under the trade name Ellepot® Organic 10 weeks.

The strip elements filled with unrooted cuttings were then immersed for six hours in a 30 ppm IBA hormone solution in such a manner that the lower stem region of the cuttings was submerged. In order to prevent the cuttings from drying out, regular misting was carried out during the treatment with the hormone solution.

The strip element ensures that the microclimate around the cuttings is maintained in an desired range for uniform callusing and root development.

The strip elements filled with unrooted cuttings were then kept in rooting containers (e.g., as shown in FIGS. 5 and 6) in a rooting station for a period of three weeks in order to allow the rooting process to take place. The rooting station (not shown) is a region with a regulated temperature and controlled supply of light and humidity. Humidity was supplied by means of misting, whereby a fertiliser (fertiliser with an EC of 1.8) was added to the mist. Misting took place initially at intervals of ten seconds every ten minutes. During the first two weeks, the intervals were increased stepwise until the cuttings were sufficiently hardy and misting could be stopped. One week before the end of the rooting period, the cuttings were pinched out manually by means of scissors. At the end of the rooting period, that is to say a few days before dispatch, the cuttings were subjected to washing with mycorrhiza, in order to promote root branching and durability of the cuttings. On the day prior to being dispatched, the cuttings were further preventively treated with a broad-spectrum fungicide.

At the end of the rooting period, the now rooted cuttings in the strip elements were prepared for transport. For this purpose, roots protruding from the bottom of each strip element were cut off. Such cutting back is necessary in order that the strip elements filled with the cuttings may be further processed by machine at the customer's end (frequently a producer of finished products). However, cutting back the roots also has the result that new and rapid root branching and root hair formation take place at the cutting bases during transport. In order to further support this new root branching and root hair formation, a fertiliser solution and a plant strengthener solution was applied. The microclimate which is thus established around the cuttings during the transport period promotes renewed root branching and root hair development in the region of the root bases.

At the customer's end, the strip elements including the rooted cuttings may be further processed by machine or by hand, and may for example be directly placed in larger containers filled with a growth medium, such as soil, without the need to remove the strip element.

Embodiments of the systems and/or methods described herein (or features thereof) are further described with reference to the following numbered paragraphs.

1. A method for producing, without the help of a substrate, a plurality of rooted cuttings from a plurality of unrooted cuttings, comprising the steps:
   inserting at least one unrooted cutting into each empty pocket from a plurality of empty pockets of a strip element, the strip element having a longitudinal dimension (L) and a transverse dimension (D) and formed at least in part of biodegradable material, the strip element forming the plurality of empty pockets arranged successively one after another in a longitudinal direction (l) of the strip element,
   wherein the strip element has a first wall-forming member and a second wall-forming member arranged to at least partly overlap the first wall-forming member in the longitudinal direction (l) and to not fully overlap the first wall-forming member in a transverse direction (d) of the strip element,
   wherein the first wall-forming member and the second wall-forming member are fixed to each other in a spacer area of the strip element longitudinally adjacent each pocket to thus delimit the plurality of pockets,
   wherein each pocket has a width (W, W') along the longitudinal direction (l) of the strip element, a depth (T) along the transverse direction (d) of the strip element, an opening at a top side facing the transverse direction (d) of the strip element and through which the at least one unrooted cutting is inserted, and a bottom side opposite the top side,
   wherein the bottom side is at least partially closed and the first wall-forming member extends past the second wall-forming member in the transverse direction (d) of the strip element at the top side of each pocket, and
   wherein the biodegradable material has a liquid retaining capacity of at least about 100 g liquid per 100 g of biodegradable material dry weight.
2. The method according to embodiment 1, wherein, in the longitudinal direction (l) of the strip element, the length of material of the second wall-forming member used in forming a pocket of the plurality of empty pockets exceeds the length of material of the first wall-forming member used in forming the pocket by at least 5% to at most 10%, 20% or 30%.
3. The method according to embodiment 1 or 2, wherein the shape of each pocket is one of essentially rectangular and essentially square.
4. The method according to embodiment 1 or 2, wherein the shape of each pocket tapers from its opening at the one side towards its bottom side.
5. The method according to embodiment 4, wherein each pocket has an upper width ($W_u$) at the top opening and a lower width ($W_l$) at the bottom side, and wherein the lower width ($W_l$) is in the range of about 50% to 70% of the upper width ($W_u$).
6. The method according to any one of embodiments 1-5, wherein a longitudinal dimension of each spacer area is one of the following:
   smaller than the width (W) of the pocket;
   at least about equal to the width (W) of the pocket; and
   larger than the width (W) of the pocket.

7. The method according to embodiment 6, wherein a spacing (S), in the longitudinal direction (l) of the strip element, between midpoints ($m_p$) of consecutive pockets is constant.

8. The method according to any one of the preceding embodiments, wherein the first wall-forming member and the second wall-forming member are fixed to each other in each spacer area of the strip element by means of at least one of adhesively bonding, crimping and stitching or sewing.

9. The method according to embodiment 8, wherein the first wall-forming member and the second wall-forming member are fixed to each along a meander-shaped bonding line ($b_m$).

10. The method according to any one of the preceding embodiments, wherein both the first wall-forming member and the second wall-forming member are paper fiber webs.

11. The method according to embodiment 10, wherein the first wall-forming member and the second wall-forming member each have a tensile strength of from 13.0 N to 16.0 N/15 mm in the longitudinal direction and from 7.0 N to 9.5 N/15 mm in the transverse direction.

12. The method according to embodiment 10 or 11, wherein the first wall-forming member and the second wall-forming member each have an air permeability in the range of from 1100 to 1200 l/m²s.

13. The method according to any one of embodiments 10-12, wherein a thickness of the strip element forming the plurality of empty pockets is in a range of about 0.5 mm to about 5 mm 14. The method according to any one of embodiments 10-13, wherein the biodegradable material has a liquid retaining capacity of at least about 200 g liquid per 100 g of biodegradable material dry weight to at least about 300 g liquid per 100 g of biodegradable material dry weight.

15. The method according to any one of the preceding embodiments, wherein the liquid is an aqueous solution comprising at least one of a nutrient, a growth promotor, an endophyte, a growth regulator and a rooting hormone.

16. The method according to any one of the preceding embodiments, further comprising the step of:
   at the end of the predetermined rooting period, dispatching the strip element with the rooted cuttings for further processing, or separating the strip element into sections each having at least one rooted cutting and dispatching the sections for further processing.

17. The method according to any one of the preceding embodiments, wherein each spacer area comprises a perforation line running along the transverse direction (d) of the strip element.

18. The method according to any one of the preceding embodiments, further comprising the step of:
   moistening, either before or after inserting the unrooted cuttings into the empty pockets, each pocket with a liquid.

19. The method according to any one of the preceding embodiments, further comprising the step of:
   arranging the strip element in a rooting station and leaving the inserted cuttings to root for a predetermined rooting period.

20. An apparatus for producing, without the help of a substrate, a plurality of rooted cuttings from a plurality of unrooted cuttings, the apparatus comprising:
   a first wall-forming member formed at least in part of biodegradable material;
   a second wall-forming member formed at least in part of the biodegradable material, the second wall-forming member arranged to at least partly overlap the first wall-forming member in a longitudinal direction (l) and to not fully overlap the first wall-forming member in a transverse direction (d); and
   a plurality of empty pockets arranged successively one after another in the longitudinal direction (l), wherein the plurality of empty pockets are collectively formed by the first wall-forming member and the second wall-forming member, and wherein each pocket has a width (W, W') along the longitudinal direction (l), a depth (T) along the transverse direction (d), an opening at a top side facing the transverse direction (d), and a bottom side opposite the top side, the bottom side being at least partially closed,
   the first wall-forming member extending past the second wall-forming member in the transverse direction (d) at the top side of each pocket, the first wall-forming member and the second wall-forming member being fixed to each other in a spacer area longitudinally adjacent each pocket to thus delimit the plurality of pockets.

21. The apparatus according to embodiment 20, wherein, in the longitudinal direction (l) of the strip element, the length of material of the second wall-forming member used in forming a pocket of the plurality of empty pockets exceeds the length of material of the first wall-forming member used in forming the pocket by at least 5% to at most 10%, 20% or 30%.

22. The apparatus according to embodiment 20 or 21, wherein the shape of each pocket is one of essentially rectangular and essentially square.

23. The apparatus according to any one of embodiments 20 or 21, wherein the shape of each pocket tapers from its opening at the one side towards its bottom side.

24. The apparatus according to embodiment 23, wherein each pocket has an upper width ($W_u$) at the top opening and a lower width ($W_l$) at the bottom side, and wherein the lower width ($W_l$) is in the range of about 50% to 70% of the upper width ($W_u$).

25. The apparatus according to any one of embodiments 20-24, wherein a longitudinal dimension of each spacer area is one of the following:
   smaller than the width (W, W') of the pocket;
   at least about equal to the width (W, W') of the pocket; and
   larger than the width (W, W') of the pocket.

26. The apparatus according to embodiment 25, wherein a spacing (S), in the longitudinal direction (l) of the strip element, between midpoints ($m_p$) of consecutive pockets is constant.

27. The apparatus according to any one of embodiments 20-26, wherein the first wall-forming member and the second wall-forming member are fixed to each other in each spacer area of the strip element by means of at least one of adhesively bonding, crimping and stitching or sewing.

28. The apparatus according to embodiment 27, wherein the first wall-forming member and the second wall-forming member are fixed to each along a meander-shaped bonding line ($b_m$).

29. The apparatus according to any one of embodiments 20-28, wherein both the first wall-forming member and the second wall-forming member are paper fiber webs.

30. The apparatus according to embodiment 29, wherein the first wall-forming member and the second wall-forming member each have a tensile strength of from 13.0 N to 16.0 N/15 mm in the longitudinal direction and from 7.0 N to 9.5 N/15 mm in the transverse direction.

31. The apparatus according to embodiment 29 or 30, wherein the first wall-forming member and the second wall-forming member each have an air permeability in the range of from 1100 to 1200 l/m²s.

32. The apparatus according to any one of embodiments 29-31, wherein a thickness of the strip element forming the plurality of empty pockets is in a range of about 0.5 mm to about 5 mm.

33. The apparatus according to any one of embodiments 29-32, wherein the biodegradable material has a liquid retaining capacity of at least about 100 g liquid per 100 g of biodegradable material dry weight to at least about 300 g liquid per 100 g of biodegradable material dry weight.

34. The apparatus according to any one of embodiments 29-33, wherein each spacer area comprises a perforation line running along the transverse direction (d).

35. A method of planting rooted cuttings, comprising:
receiving an apparatus with a plurality of pockets according to any one of embodiments 20-34, wherein each pocket holds at least one rooted cutting;
separating a pocket holding at least one rooted cutting from the apparatus; and planting the pocket holding the at least one rooted cutting in a growth medium.

36. The method of embodiment 35, wherein the growth medium is soil.

37. A system for producing, without the help of a substrate, a plurality of rooted cuttings from a plurality of unrooted cuttings, the system comprising:
a strip element having a longitudinal dimension (L) and a transverse dimension (D) and consisting essentially of biodegradable material, the strip element forming a plurality of empty pockets arranged successively one after another in a longitudinal direction (l) of the strip element, wherein the strip element has a first wall-forming member and a second wall-forming member arranged to at least partly overlap the first wall-forming member in the longitudinal direction (l) and to not fully overlap the first wall-forming member in a transverse direction (d) of the strip element, wherein the first wall-forming member and the second wall-forming member are fixed to each other in a spacer area of the strip element longitudinally adjacent each pocket to thus delimit the plurality of pockets, wherein each pocket has a width (W, W') along the longitudinal direction of the strip element, a depth (T) along the transverse direction (d) of the strip element, an opening at a top side facing the transverse direction (d) of the strip element, and a bottom side opposite the top side, wherein the bottom side is at least partially closed and the first wall-forming member extends past the second wall-forming member in the transverse direction (d) of the strip element at the top side of each pocket, and wherein the biodegradable material has a liquid retaining capacity of at least about 100 g liquid per 100 g of biodegradable material dry weight; and
at least one cutting inserted into each previously empty pocket.

38. The system according to embodiment 37, wherein, in the longitudinal direction (l) of the strip element, the length of material of the second wall-forming member used to form a pocket of the plurality of empty pockets exceeds the length of material of the first wall-forming member used to form the said pocket by at least 5% to at most 25%.

39. The system according to embodiment 37 or 38, wherein the shape of each pocket is one of essentially rectangular and essentially square.

40. The system according to embodiment 37 or 38, wherein the shape of each pocket tapers from its opening at the one side towards its bottom side.

41. The system according to embodiment 40, wherein each pocket has an upper width ($W_u$) at the top opening and a lower width ($W_l$) at the bottom side, and wherein the lower width ($W_l$) is in the range of about 50% to 70% of the upper width ($W_u$).

42. The system according to any one of embodiments 37-41, wherein a longitudinal dimension of each spacer area is one of the following:
smaller than the width (W, W') of the pocket;
at least about equal to the width (W, W') of the pocket; and
larger than the width (W, W') of the pocket.

43. The system according to embodiment 42, wherein a spacing (S), in the longitudinal direction (l) of the strip element, between midpoints ($m_p$) of consecutive pockets is constant.

44. The system according to any one of embodiments 37-43, wherein the first wall-forming member and the second wall-forming member are fixed to each other in each spacer area of the strip element by means of at least one of adhesively bonding, crimping and stitching or sewing.

45. The system according to embodiment 44, wherein the first wall-forming member and the second wall-forming member are fixed to each along a meander-shaped bonding line ($b_m$).

46. The system according to any one of embodiments 37-45, wherein both the first wall-forming member and the second wall-forming member are paper fiber webs.

47. The system according to embodiment 46, wherein the first wall-forming member and the second wall-forming member each have a tensile strength of from 13.0 N to 16.0 N/15 mm in the longitudinal direction (l) and from 7.0 N to 9.5 N/15 mm in the transverse direction (d).

48. The system according to embodiment 46 or 47, wherein the first wall-forming member and the second wall-forming member each have an air permeability in the range of from 1100 to 1200 l/m²s.

49. The system according to any one of embodiments 46-48, wherein a thickness of the strip element forming the plurality of empty pockets is in a range of about 0.5 mm to about 5 mm.

50. The system according to any one of embodiments 46-49, wherein the biodegradable material has a liquid retaining capacity of at least about 200 g liquid per 100 g of biodegradable material dry weight to at least about 300 g liquid per 100 g of biodegradable material dry weight.

51. The system according to any one of embodiments 37-50, wherein each spacer area comprises a perforation line running along the transverse direction (d) of the strip element.

What is claimed:

1. A method, comprising the steps:
    inserting at least one unrooted cutting from a plurality of unrooted cuttings into each empty pocket from a plurality of empty pockets of a strip element, the strip element having a longitudinal dimension and a transverse dimension and formed at least in part of biodegradable material, the strip element forming the plurality of empty pockets arranged successively one after another in a longitudinal direction of the strip element,
    wherein the strip element has a first wall-forming member and a second wall-forming member arranged to overlap the first wall-forming member in the longitudinal direction to collectively form the plurality of empty,
    wherein the first wall-forming member and the second wall-forming member are fixed to each other in a spacer area of the strip element longitudinally adjacent each pocket to thus delimit the plurality of empty pockets, the first wall-forming member and the second wall-forming member being fixed such that a portion of the second wall-forming member corresponding to the plurality of empty pockets is spaced apart from the first wall-forming member,
    wherein each pocket has a depth along a transverse direction of the strip element, an opening at a top side facing the transverse direction of the strip element and through which the at least one unrooted cutting is inserted, and a bottom side opposite the top side,
    wherein the bottom side is at least partially closed and the first wall-forming member extends past the second wall-forming member in the transverse direction of the strip element at the top side of each pocket,
    wherein each pocket is tapered in the longitudinal direction of the strip element such that the top side of each pocket is wider than the bottom side of each pocket,
    wherein each spacer area of the strip element is formed between corresponding pockets and is tapered in the longitudinal direction of the strip element such that a bottom side of each spacer area is wider than a top side of each spacer area, the top side of each spacer being closed, the arrangement of the empty pockets and the spacer areas facilitating the inserting of the at least one unrooted cutting into each empty pocket,
    wherein the biodegradable material has a liquid retaining capacity of at least about 100 g liquid per 100 g of biodegradable material dry weight, and
    wherein the strip element facilitates production, without the use of a substrate, of a plurality of rooted cuttings from the plurality of unrooted cuttings.

2. The method according to claim 1, wherein, in the longitudinal direction of the strip element, a length of material of the second wall-forming member used in forming a pocket of the plurality of empty pockets exceeds the length of material of the first wall-forming member used in forming the pocket by at least 5% to at most 10%, 20% or 30%.

3. The method according to claim 1, wherein the first wall-forming member and the second wall-forming member are fixed to each other in each spacer area of the strip element by means of at least one of adhesively bondiong, crimping, and stitching or sewing.

4. The method according to claim 1, wherein both the first wall-forming member and the second wall-forming member are paper fiber webs.

5. The method according to claim 1, wherein the liquid is an aqueous solution comprising at least one of a nutrient, a growth promotor, an endophyte, a growth regulator and a rooting hormone.

6. The method according to claim 1, further comprising the step of:
    at an end of a predetermined rooting period, dispatching the strip element with the rooted cuttings for further processing, or separating the strip element into sections each having at least one rooted cutting and dispatching the sections for further processing.

7. The method according to claim 1, further comprising the step of:
    moistening, either before or after inserting the unrooted cuttings into the empty pockets, each pocket with a liquid.

8. The method according to claim 1, further comprising the step of:
    arranging the strip element in a rooting station and leaving the inserted cuttings to root for a predetermined rooting period.

9. An apparatus, comprising:
    a first wall-forming member formed at least in part of biodegradable material;
    a second wall-forming member formed at least in part of the biodegradable material, the second wall-forming member arranged to overlap the first wall-forming member in a longitudinal direction; and
    a plurality of empty pockets arranged successively one after another in the longitudinal direction, wherein the plurality of empty pockets are collectively formed by the first wall-forming member and the second wall-forming member, and wherein each pocket has a depth along the transverse direction, an opening at a top side facing the transverse direction, and a bottom side opposite the top side, the bottom side being at least partially closed,
    the first wall-forming member extending past the second wall-forming member in the transverse direction at the top side of each pocket, the first wall-forming member and the second wall-forming member being fixed to each other in a spacer area longitudinally adjacent each pocket to thus delimit the plurality of empty pockets, the first wall-forming member and the second wall-forming member being fixed such that a portion of the second wall-forming member corresponding to the plurality of empty pockets is spaced apart from the first wall-forming member,
    wherein each pocket is tapered in the longitudinal direction of the strip element such that the top side of each pocket is wider than the bottom side of each pocket,
    wherein each spacer area of the strip element is formed between corresponding pockets and is tapered in the longitudinal direction of the strip element such that a bottom side of each spacer area is wider than a top side of each spacer area, the top side of each spacer being closed, the arrangement of the empty pockets and the spacer areas facilitating the inserting of the at least one unrooted cutting into each empty pocket,
    wherein each pocket is configured to receive at least one unrooted cutting from a plurality of unrooted cuttings, the apparatus facilitates production, without the use of a substrate, of a plurality of rooted cuttings from the plurality of unrooted cuttings.

10. The apparatus according to claim 9, wherein, in the longitudinal direction, a length of material of the second wall-forming member used in forming a pocket of the plurality of empty pockets exceeds the length of material of the first wall-forming member used in forming the pocket by at least 5% to at most 10%, 20% or 30%.

11. The apparatus according to claim 9, wherein each pocket has an upper width at the top opening and a lower width at the bottom side, and wherein the lower width is in a range of about 50% to 70% of the upper width.

12. The apparatus according to claim 9, wherein a longitudinal dimension of each spacer area is one of the following:
   smaller than the width of the pocket;
   at least about equal to the width of the pocket; and
   larger than the width of the pocket.

13. The apparatus according to claim 12, wherein a spacing in the longitudinal direction between midpoints of consecutive empty pockets is constant.

14. The apparatus according to claim 9, wherein the first wall-forming member and the second wall-forming member are fixed to each other in each spacer area by means of at least one of adhesively bonding, crimping, and stitching or sewing.

15. The apparatus according to claim 14, wherein the first wall-forming member and the second wall-forming member are fixed to each along a meander-shaped bonding line.

16. The apparatus according to claim 9, wherein both the first wall-forming member and the second wall-forming member are paper fiber webs.

17. The apparatus according to claim 16, wherein the first wall-forming member and the second wall-forming member each have a tensile strength of from 13.0 N to 16.0 N/15 mm in the longitudinal direction and from 7.0 N to 9.5 N/15 mm in the transverse direction.

18. The apparatus according to claim 16, wherein the first wall-forming member and the second wall-forming member each have an air permeability in a range of from 1100 l/m²s to 1200 l/m²s.

19. The apparatus according to claim 16, wherein a thickness of the apparatus is in a range of about 0.5 mm to about 5 mm.

20. The apparatus according to claim 16, wherein the biodegradable material has a liquid retaining capacity of at least about 100 g liquid per 100 g of biodegradable material dry weight to at least about 300 g liquid per 100 g of biodegradable material dry weight.

21. The apparatus according to claim 16, wherein each spacer area comprises a perforation line running along the transverse direction.

22. A method of planting rooted cuttings, comprising:
   receiving the apparatus according to claim 10 having the plurality of empty pockets, wherein each pocket holds at least one rooted cutting;
   separating a pocket holding at least one rooted cutting from the apparatus; and
   planting the pocket holding the at least one rooted cutting in a growth medium.

23. A system, comprising:
   a strip element having a longitudinal dimension and a transverse dimension and consisting essentially of biodegradable material, the strip element forming a plurality of empty pockets arranged successively one after another in a longitudinal direction of the strip element, wherein the strip element has a first wall-forming member and a second wall-forming member arranged to overlap the first wall-forming member in the longitudinal direction to collectively form the plurality of empty pockets, wherein the first wall-forming member and the second wall-forming member are fixed to each other in a spacer area of the strip element longitudinally adjacent each pocket to thus delimit the plurality of empty pockets, wherein the first wall-forming member and the second wall-forming member are fixed such that a portion of the second wall-forming member corresponding to the plurality of empty pockets is spaced apart from the first wall-forming member, wherein each pocket has a a depth along the transverse direction of the strip element, an opening at a top side facing the transverse direction of the strip element, and a bottom side opposite the top side, wherein the bottom side is at least partially closed and the first wall-forming member extends past the second wall-forming member in the transverse direction of the strip element at the top side of each pocket, wherein each pocket is tapered in the longitudinal direction of the strip element such that the top side of each pocket is wider than the bottom side of each pocket, wherein each spacer area of the strip element is formed between corresponding pockets and is tapered in the longitudinal direction of the strip element such that a bottom side of each spacer area is wider than a top side of each spacer area, the top side of each spacer being closed, the arrangement of the empty pockets and the spacer areas facilitating the inserting of the at least one unrooted cutting into each empty pocket, wherein the biodegradable material has a liquid retaining capacity of at least about 100 g liquid per 100 g of biodegradable material dry weight and wherein the strip element facilitates production, without the use of a substrate, of a plurality of rooted cuttings from a plurality of unrooted cuttings; and
   at least one cutting from the plurality of unrooted cuttings inserted into each previously empty pocket.

24. The system according to claim 23, wherein, in the longitudinal direction of the strip element, a length of material of the second wall-forming member used to form a pocket of the plurality of empty pockets exceeds the length of material of the first wall-forming member used to form the said pocket by at least 5% to at most 25%.

25. The system according to claim 23, wherein each pocket has an upper width at the top side and a lower width at the bottom side, and wherein the lower width is in a range of about 50% to 70% of the upper width.

26. The system according to claim 23, wherein a longitudinal dimension of each spacer area is one of the following:
   smaller than the width of the pocket;
   at least about equal to the width of the pocket; and
   larger than the width of the pocket.

27. The system according to claim 23, wherein the first wall-forming member and the second wall-forming member are fixed to each other in each spacer area of the strip element by means of at least one of adhesively bonding, crimping, and stitching or sewing.

28. The system of claim 23, wherein the bottom side of each pocket is open.

29. The apparatus of claim 9, wherein the bottom side of each pocket is open.

30. The system of claim 23, wherein the bottom side of each pocket is open.

* * * * *